United States Patent [19]

Johnson

[11] Patent Number: 4,774,742

[45] Date of Patent: Oct. 4, 1988

[54] RAPPELLING TOOL

[76] Inventor: Lloyd Johnson, Box 2 80, RD #2, Bennington, Vt. 05201

[21] Appl. No.: 33,747

[22] Filed: Apr. 3, 1987

[51] Int. Cl.[4] .......... F16G 11/00

[52] U.S. Cl. .......... 24/129 R; 24/129 B

[58] Field of Search .......... 24/129 R, 129 B, 129 C, 24/129 A

[56] References Cited

U.S. PATENT DOCUMENTS

| | | | |
|---|---|---|---|
| 468,819 | 2/1892 | McAnarney | 24/129 R |
| 897,565 | 9/1908 | Walker | 24/129 B |
| 1,205,496 | 11/1916 | Whitehead | 24/129 R |
| 1,441,737 | 1/1923 | Mickelson | 24/129 R |
| 1,472,840 | 11/1923 | Humphreys | 24/129 R |
| 1,476,627 | 12/1923 | Luebke et al. | 24/129 R |
| 1,546,798 | 7/1925 | Seagren | 24/129 B |
| 1,565,041 | 12/1925 | Arney | 24/129 R |
| 2,386,836 | 10/1945 | Blagden | 24/129 R |
| 2,441,336 | 5/1948 | Sova | 24/129 R |
| 2,538,021 | 1/1951 | Lushbaugh | 24/129 R |

*Primary Examiner*—Victor N. Sakran
*Attorney, Agent, or Firm*—Schmeiser, Morelle & Watts

[57] ABSTRACT

A rappelling tool having at least two essentially orthogonal tabs projecting from a ring. The first tab has an aperture by which it is connected to a rappeller's waist belt or seating apparatus carabiner. The second tab, essentially orthogonal to the first is provided for slidably retaining a rope that has been wound about it. The invention allows a threading of a rope thereto without the necessity of disconnecting it from the user. Hornlike projections from the second tab provide the facility for wrapping the rope about the tab, thus securing the rappelling user in a static condition during decent.

3 Claims, 1 Drawing Sheet

FIG. 1
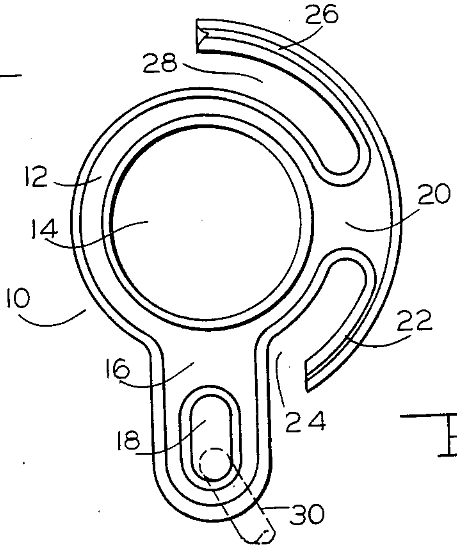
FIG. 2
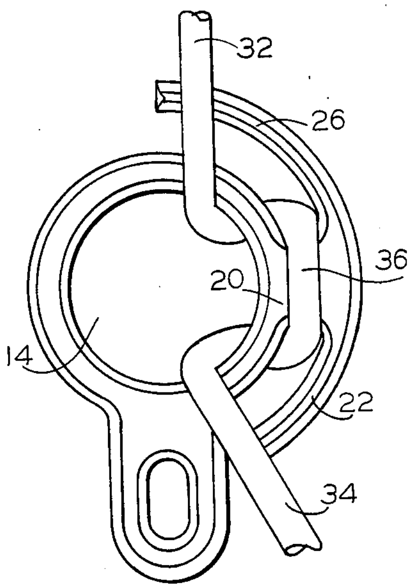
FIG. 3
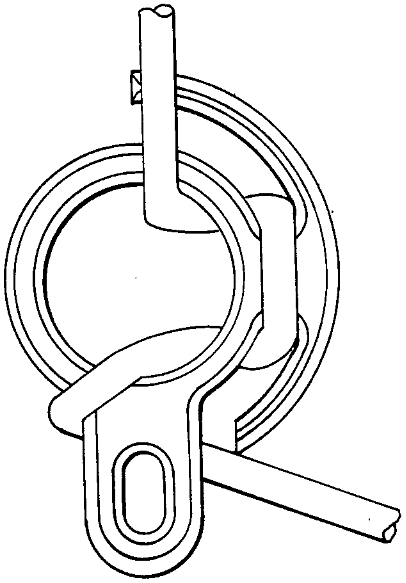
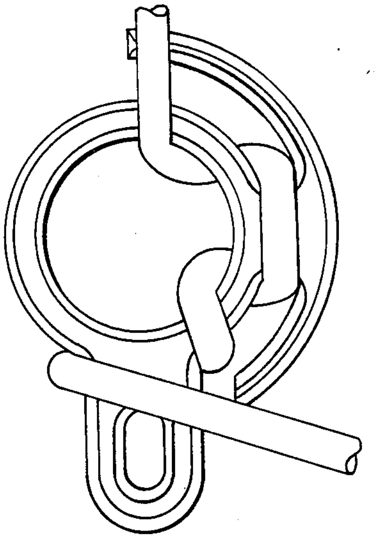
FIG. 4
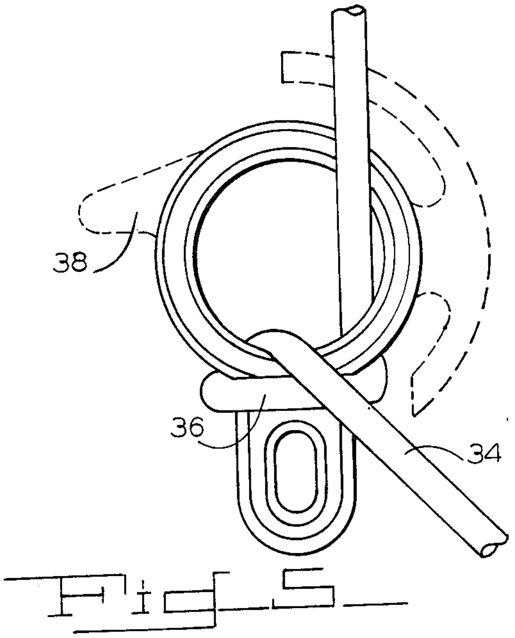
FIG. 5

RAPPELLING TOOL

FIELD OF THE INVENTION

This invention relates generally to devices which are used in mountain climbing and other activities wherein rapid descents are made by an individual using a single cord or rope. More specifically, this invention relates to a rappelling tool or descender, through which a rope is threaded, and which enables the individual's controlled descent on the rope by creating a snubbing action, effected by the various patterns of rope threading, that allows the user to slow his rate of descent.

BACKGROUND AND SUMMARY OF THE INVENTION

A descender is a device that is conventionally attached to a seat or girding belt, through which has been threaded a single rope or line, which enables a person to effect a controlled descent. Control is exercised during the descent by alternately tightening and loosening the untethered end of the rope on which the person is descending. Such tightening and loosening has the effect of snubbing and releasing the rope as it travels through the particular threading pattern in the descender. Conventionally, descenders are comprised of one or more pieces of rigid, durable and abrasion-resistant material.

The traditional, and often used, descender is a singular device in the shape of an inverted "figure-eight". The smaller, (lower) loop of the "figure-eight" is attached to the girding belt or seat (harness) of the user by a snap link, commonly referred to as a carabiner. The rope to be descended is generally set out, unextended and untethered. The end to be tethered is passed first into the top or larger ring of the "figure-eight", out and back around the connecting bridge (between the two loops) and through the larger ring or loop, in the direction opposite its insertion. The rope is then tethered and the remainder is cast over the precipice which is to be descended.

After the threading of the descender, the user must tighten the portion of the rope which is tethered and firmly grasp the untethered portion over which he will descend. Once the descent is begun, the threading of the rope through the descender in conjunction with the particular geometry of the descender, allows the formation of a stylized "slip-knot" which may be alternately tightened and loosened by the user. The tightening is effectively a snubbing, caused by pulling downward on the untethered portion of the rope; while, loosening of the stylized knot is effected by carefully releasing the downward tension on the untethered portion of the rope. This alternate tightening and loosening of the stylized knot on the descender, allows a controlled descent on the rope.

Generally, in the hands of an experienced user, the traditional "figure-eight" descender may be used effectively and with relative safety. However, the most experienced user encounters two very prominent problems with the use of the "figure-eight" descender. The first is often manifested if the untethered portion of the rope is slackened excessively. This occurs when the user is attempting to descend very rapidly. Essentially, the stylized knot on the descender loosens and slips up and over the upper or larger loop of the inverted "figure-eight". This has the effect of knotting the rope away from the point of snubbing (and control). As a result, the user must physically pull himself upward and loosen the knot, bringing it back to its proper snubbing configuration, with the rope passing essentially through and around the junction of both loops in the "figure-eight". For the uninitiated, this can be an arduous, if not dangerous, maneuver because the user could very easily exhaust himself.

Relative to the aforementioned problem, some "figure-eight" descenders have been modified to preclude the rope passing completely over the larger loop or ring of the "figure-eight". This has been accomplished by the addition of two tab-like members placed opposite to each other, at the top of, and tangential to the larger ring. These tabs are known as "ears" and, in fact, give an appearance of an inverted "figure-eight" with ears. They have the function of preventing the stylized knot from completely slipping off the larger ring of the "figure-eight" descender. Although this safety adjunct does effectively prevent a complete halt to the descent, it nonetheless does not avoid an occurrence of the problem; it simply avoids the most hazardous aspects of the problem. The instant invention avoids the aforementioned problem completely by utilizing a different form of threading, a form that is obtainable only through use of the invention's unique geometry.

The second most commonly encountered problem using traditional descenders is one which is inherent in the design of all descenders that require a prethreading before use. The traditional "figure-eight" descender must, as pointed out above, be threaded before the rope is either extended or tethered. Usually, the descender is threaded and then attached to the belt or seat carabiner. As will be pointed out more clearly in the Detailed Description of the Preferred Embodiment, the threading of the traditional "figure-eight" descender does not allow a rapid threading while the descender is still connected to the user. The instant invention achieves significant utility in that it may be threaded while attached to the user and, in the case of a seasoned experienced user, may be threaded and even replaced during the descent.

Briefly, the present invention avoids the most significant problems of the conventional art by providing a unitary rappelling tool that is comprised of a rigid, durable, abrasion-resistant material such as aluminum. It consists of a planar ring structure having at least two coplanar essentially orthogonll projections, one of which contains an aperture for linking the device to a users seat or belt apparatus. The second projection, hereinafter referred to as a second tab, serves as a capstan around which the cord or rope may be wound or threaded. In the preferred embodiment, this tab has protrusions or extensions therefrom. Such protrusions or extensions on the capstan-like tab serve only to assure that the rope will not slip off the tab, under any condition.

The orthogonal placement of the tabs in relation to the planar ring lends both the utilitarian and novel character to the invention. In conjunction with the various threading configurations hereinafter discussed, the invention provides reasonable, safe solutions to the two most prominent problems that have plagued climbers since the inception of the sport and the first use of the "figure-eight" descender.

BRIEF DESCRIPTION OF THE DRAWINGS

FIG. 1 is an illustration showing the geometry of the preferred embodiment;

FIG. 2 is the invention of FIG. 1 showing a preferred threading;

FIG. 3 is the invention of FIG. 1 showing an alternative threading;

FIG. 4 illustrates an alternative threading; and

FIG. 5 is an illustration of conventional threading on the traditional "figure-eight" descender.

DETAILED DESCRIPTION OF THE PREFERRED EMBODIMENT

Referring more particularly now to FIG. 1, the illustration shows the preferred design of the invention 10. The main portion, ring 12 is a planar ring of rigid, durable, abrasion-resistant material such as aluminum. Ring 12 defines rope aperture 14. A first tab 16, called the link tab, projects from ring 12 forming a vestige of the smaller loop of the traditional "figure-eight", and herein referred to as link aperture 18. A carabiner 30 is detailed in phantom cross-section passing into link aperture 18.

The novel aspect of this invention comprises the essentially orthogonal tab 20 extending toward the right side of FIG. 1. It can be readily seen that, in and of itself tab 20 comprises a post or capstan about which a rope may be wound. To preclude the possibility of such a winding slipping off tab 20, a pair of opposing horns 22, 26, specifically termed a lower or first horn 22 and an upper or second horn 26 have been provided. Those of ordinary skill in the art will recognize that the horns may be of the lengths illustrated, or may continue around in an arc, concentric to ring 12, until they join tab 16. An alternative configuration is to effect the FIG. 1 embodiment by constructing a device such as therein illustrated, but having symmetry about the vertical axis passing through both apertures. Although varying configurations or geometries may be conceived and employed, the greatest utility of this invention is acquired by effecting the lower rope slot or first slot 24 and the upper rope slot or second slot 28 As will be seen hereinafter, it is this precise geometry, save for the lengths of the horns, that allows the user to thread (or rethread) the descender without disconnecting it first from his person.

In using the preferred embodiment, a preferred threading is also employed as illustrated in FIG. 2. To thread the invention, the user first forms a bight 36 or loop in the rope 32, 34 and passes it through rope aperture 14. The bight is then grasped at the underside of the invention and looped over horns 22, 26. In the illustration, rope portion 32 represents the tethered end; and, portion 34 represents the control end which is manipulated by the user to control the degree of snubbing exerted on the rope as it passes through the rope aperture and around the capstan effected by tab 20. The control end 34 of the rope is shown passing toward the right side. This is the configuration generally employed by a right-handed person when making a controlled descent using the invention.

FIGS. 3 and 4 show alternative threading arrangements, the latter allowing greater control and safety but requiring a somewhat slower descent rate. In the threading configurations of FIGS. 2, 3 and 4, those familiar with the use of descenders will recognize that more rapid descents may be achieved if control end 34 were allowed to pass to the left side. However, as mentioned above, such variations should never be attempted by the inexperienced or uninitiated user. Optimized descent rate, consistent with maximum safety, is achieved using the preferred embodiment in the preferred threading configuration of FIG. 2.

As may be readily inferred from a view of the drawings, an experienced climber can secure his position during descent by merely looping the rope's control portion 34 around the horns. Once in the static position, the climber may even replace the descender by using the aforementioned threading technique to thread on a bight from the untethered control portion 34 that is completely slack. Such a facility cannot even be contemplated with any of the contemporary "figure-eight" devices.

FIG. 5 is an illustration of the invention without the novel second tab and horn extensions. It is readily apparent that, in order to secure bight 36 in the manner therein shown, the user must detach the descender from his belt or seating apparatus. In order to avoid the first defined problem, "ears" were added to the "figure-eight" (one member 38 an "ear" pair has been illustrated in phantom). One can observe that a pair of projections 38 should constrain bight 36 and a slackened control portion 34 from rising off the larger ring of the conventional "figure-eight" device. However, once the rope slips about a pair of safety "ears", it is problematic to what degree control is retained by the user. Reference to FIG. 2, and the preferred threading through the preferred embodiment, reveals the impossibility of such a problem occurring with the present invention.

Other advantages to the invention shall be discerned by the experienced climber through use of the invention. The preferred embodiment is offered so as to gain the benefits of increased utility and safety, which will become apparent by continued practice of the invention. Since there are numerous possible threading variations and varying geometries, the scope of this invention is meant to be limited only by the appended claims.

What is claimed:

1. A unitary rappelling tool of rigid, durable, abrasion-resistant material for effecting controlled, signal rope descent by a climber using said tool and comprising a planar circular ring which has at least two coplanar tabs projecting therefrom and 90 degrees to each other, a first tab having a hole therethrough and second tab having rope retention means thereon, said rope retention means further comprising two opposing horns, a first horn which projects orthogonally from said second tab and arcs concentrically to said ring toward said first tab, and a second horn which projects opposite said first horn and arcs concentrically to said ring, said horns defining non-cinching, rope-snubbing slots between them and said ring so as to prevent a rope secured about said rope retention means from slipping off said rope retention means while allowing it to slide through said snubbing slots, whereby a climber employing said tool for descending a rope passes said rope through the circular ring and then slidably snubs it by various looping configurations placed around said rope retention means.

2. The invention of claim 1 wherein said first horn is truncated before it contacts the first tab.

3. The invention of claim 2 wherein said second horn is longer than said first horn.

* * * * *